(12) United States Patent
Kim (10) Patent No.: US 7,496,388 B2
(45) Date of Patent: Feb. 24, 2009

(54) SLIDE ASSEMBLY FOR MOBILE COMMUNICATION DEVICE

(75) Inventor: Yeong Joong Kim, Ansan-si (KR)

(73) Assignee: LG Electronics Inc., Seoul (KR)

( * ) Notice: Subject to any disclaimer, the term of this patent is extended or adjusted under 35 U.S.C. 154(b) by 801 days.

(21) Appl. No.: 10/935,748

(22) Filed: Sep. 8, 2004

(65) Prior Publication Data

US 2005/0054398 A1 Mar. 10, 2005

(30) Foreign Application Priority Data

Sep. 9, 2003 (KR) ...................... 10-2003-0063287

(51) Int. Cl.
*H04B 1/38* (2006.01)
(52) U.S. Cl. ................ 455/575.4; 379/433.12
(58) Field of Classification Search ............. 455/550.1, 455/575.1, 575.4; 379/433.01, 433.11, 433.12
See application file for complete search history.

(56) References Cited

U.S. PATENT DOCUMENTS 5,335,274 A * 8/1994 Masuda et al. ......... 379/433.12
6,647,274 B1 * 11/2003 Alanen et al. ............ 455/550.1
7,158,818 B2 * 1/2007 Lee .......................... 455/575.4
7,162,283 B2 * 1/2007 Bae et al. ................. 455/575.4
2002/0137476 A1 9/2002 Shin

FOREIGN PATENT DOCUMENTS

| CN | 13771790 A | 2/2002 |
|---|---|---|
| CN | 1377170 A | 10/2002 |
| JP | 04-273744 | 9/1992 |
| JP | 05-244238 | 9/1993 |
| JP | 05284198 | 10/1993 |
| JP | 2003-125052 | 4/2003 |

OTHER PUBLICATIONS

Chinese Office Action with English translation, Jun. 2006.
Japanese Office Action dated Dec. 15, 2006 with translation.
European Office Action dated mar. 3, 2008.

* cited by examiner

*Primary Examiner*—Nguyen Vo
(74) *Attorney, Agent, or Firm*—KED & Associates LLP (57) ABSTRACT

A slide assembly for a mobile communication device such but not limited to a mobile phone or a PDA. The slide assembly includes a body and a slider arranged parallel to the body. The slider has at least one long slot and at least one guide member passed through the slot and connected to the body for guiding the slider to slide with respect to the body and preventing the slider from breaking away from the body.

32 Claims, 5 Drawing Sheets

SLIDE ASSEMBLY FOR MOBILE COMMUNICATION DEVICE

BACKGROUND OF THE INVENTION

1. Field of the Invention

The present invention generally relates to slide assemblies, and more particularly, to a slide assembly applicable to a mobile communication device, such as a mobile phone, PDA, and the like.

2. Background of the Related Art

As technology develops, mobile communication services will not be limited to the simple transfer of voice information, but will also include the transmission of character information, graphic information, games, and the like.

Typical examples of mobile communication devices include mobile phones and PDAs. Mobile phones may be classified according to their body structure, e.g., there are bar type phones, flip type phones, and folder-type phones. Though the bar- and flip-type phones have simple structures, they have long bodies which make them undesirable. The folder-type phone is convenient to carry, because when folded the length of the body is short. Use of this type of phone is also convenient, since when unfolded the body becomes long enough to hold and operate. However, the folder-type mobile phone has a problem in that a hinge part is liable to break due to frequent folding/unfolding of the phone.

Slide-type phones have been improved to overcome some of the problems of folder-type phones. Slide-type phones, for example, have a slide module fabricated separately and held to a body and slider respectively. This allows the body length of the phone to be extended/shortened, as the slider can be slid parallel to the body. Slide-type phones are also more durable because there are no parts that rotate and no excessive forces are pivotally applied thereto.

In spite of the above advantages, the body and slider of a typical slide-type mobile phone are provided with separately fabricated structures for holding parts of the slide module. Consequently, the typical slide-type mobile phone has complicated body and slider structures. Also, these phones tend to be thick, e.g., at least as thick as the parts required for holding the slide module.

SUMMARY OF THE INVENTION

An object of the invention is to solve at least the above problems and/or disadvantages and to provide at least one of the advantages described hereinafter.

It is another object of the present invention to provide a slide assembly for a mobile communication device in which the structure of a slide assembly is simplified to reduce a thickness of a mobile communication device (such as a mobile phone or PDA) and/or improve efficiency and productivity of manufacture.

To achieve these and other objects and advantages, the present invention provides a slide assembly for a mobile communication device which includes a body, a slider arranged parallel to the body, the slider having at least one long slot, and at least one guide member passed through the slot and connected to the body, for guiding the slider to slide with respect to the body, and preventing the slider from breaking away from the body. The slide assembly further preferably includes an elastic member in contact with the body and the slider for supporting the body and the slider, elastically. Also, the slots may be on opposite sides of a sliding direction of the slider, although other arrangements are possible.

The elastic member includes a flat portion attached to the body, and at least one bent portion projected toward the slider from the flat portion for supporting the slider, elastically. Preferably, the bent portions are at opposite ends of the flat portion. Also, the bent portion may have a width larger than a width of the slot and may support a portion of the slider adjacent to opposite sides of the slot. The flat portion is preferably fastened to a back surface of the body, and the bent portion passes through the body. Also, it is preferable for the elastic member to support the slider from front and back sides of the guide member with respect to a moving direction of the slider.

The slider further includes at least one projection projected toward the body from the slider for holding the elastic member when the guide member is moved to, and stops at an end of the slot. The slider further includes at least one long groove for receiving an upper portion of the guide member, the long groove having a bottom provided with the slot. In this case, the slider may further include at least one cover inserted in the groove.

The slider may further include a middle portion facing a front surface of the body, and side portions on opposite sides of, and higher than the middle portion, the side portions being supported on the elastic members. The body includes at least one recess for inserting a lower portion of the guide member.

The guide member may include a guide passed through the slot, and connected to the body, and a head on top of the guide, the head having a width larger than a width of the slot.

The slide assembly may further include a fastening member for holding the elastic member, the guide member, and the body together. In this case, the holding member may be passed through the body, and the elastic member, and fastened to the guide member.

The slide assembly may further include an opening at least one of the body and the slider, for pass of wires electrically connecting electrical components mounted on the body and the slider.

It is to be understood that both the foregoing general description and the following detailed description of the present invention are exemplary and explanatory and are intended to provide further explanation of the invention as claimed.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

DETAILED DESCRIPTION OF PREFERRED EMBODIMENTS

In accordance with one or more embodiments of the present invention, a slide assembly is provided which is applicable to mobile communication devices such as but not limited to mobile phones and PDAs (Personal Digital Assistants). A length of a device or product having the slide assembly of the present invention applied thereto can be varied with manipulation of the user. The slide assembly of the present invention may therefore be especially suitable for use with a mobile phone.

Figure 1:
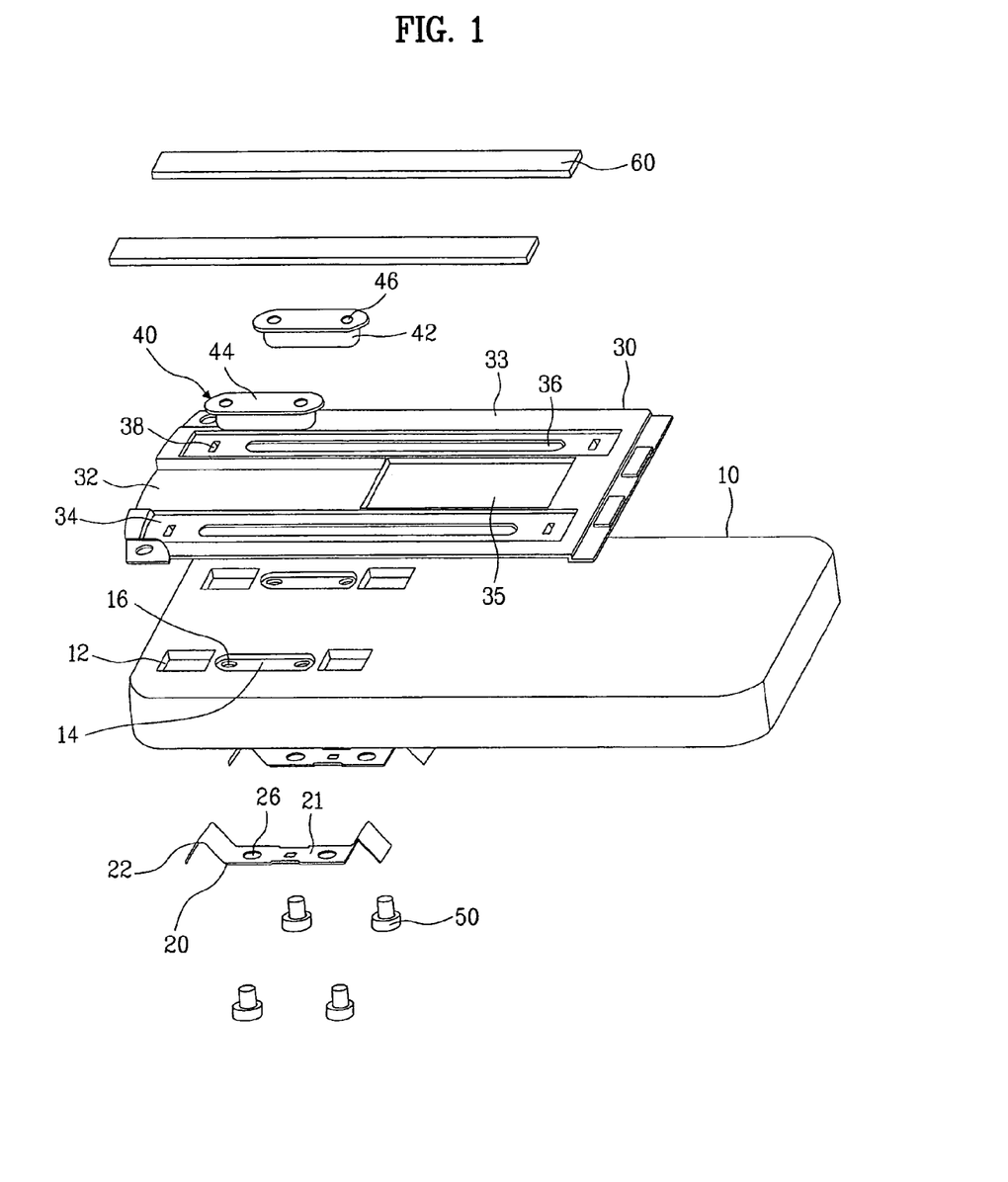
FIG. 1 illustrates a disassembled perspective view of a slide assembly in accordance with a preferred embodiment of the present invention.

Referring to FIG. 1, a slide assembly in accordance with one embodiment includes a body 10, a slider 30, and a guide member 40. The slide assembly may further include elastic members 20 for smooth movement of the slider 30 on the body 10, and preventing friction between them.

In the slide assembly, a board having chips mounted thereon, and at least one of electronic component such as a keypad, a display, and the like are mounted on either of the body 10 or the slider 30. For an example, a board and keypad may be mounted on body 10, and the display may be provided to the slider 30.

Figure 2:
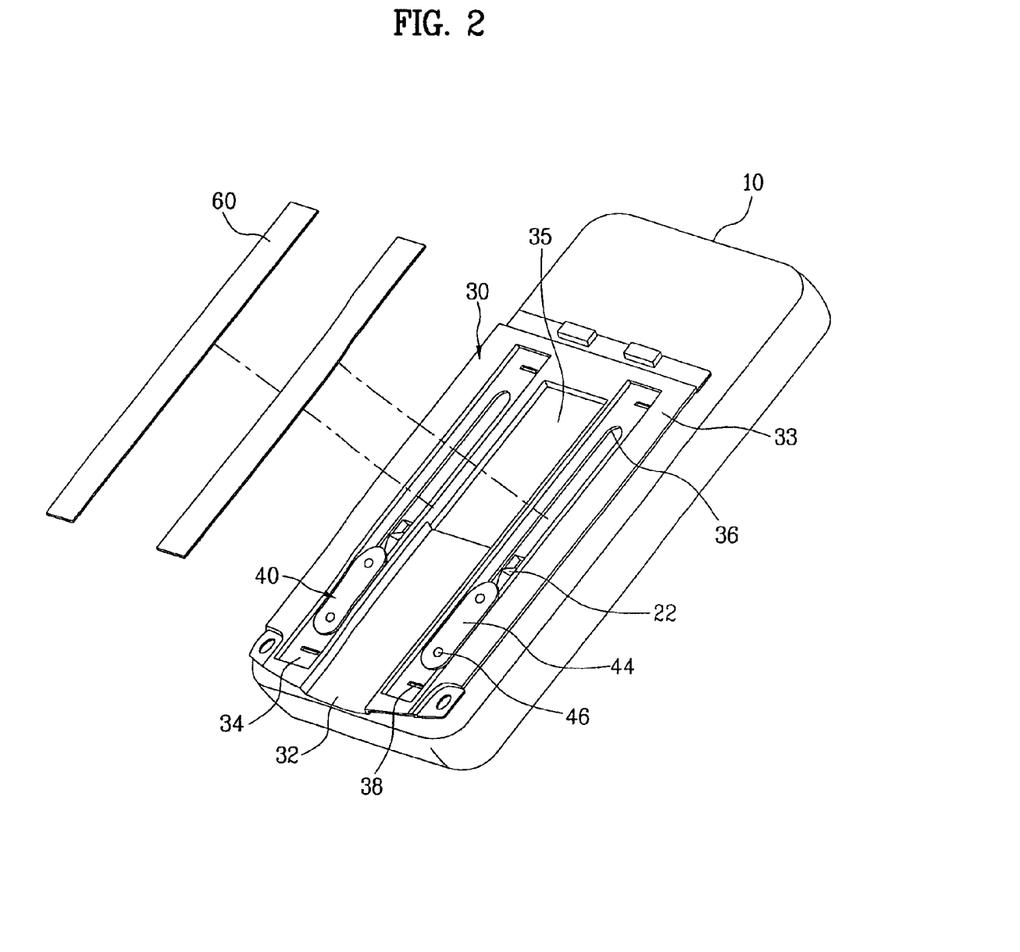
FIG. 2 illustrates a perspective view of an assembled slide assembly in FIG. 1 in a state only a cover is removed therefrom.

In a case where the electronic components are provided both to the body 10 and the slider 30, it is required to connect the components mounted on body and the components mounted on the slider 30. To achieve this connection, it is preferable for there to be an opening 35 in at least one of the body 10 and the slider 30 for passing wires that connect the components mounted on the body and slider. For illustrative purposes, FIGS. 1 and 2 show an example in which opening 35 is provided to slider 30.

The body 10 has at least one aperture 12 for receiving a part of the elastic member 20. However, this aperture may not be provided if the elastic member 20 is attached to a front surface of the body 10. For illustrative purposes, four apertures are shown.

The guide member 40 has a lower portion inserted in a recess 14 between the apertures 12. The recess 14 in the body 10 is convenient as engagement of the lower portion of the guide member 40 with the body 10 becomes easy. However, recess 14 is considered to be optional and if desired may not be provided to the body.

The slider 30 is arranged to face a front surface of the body 10 and in parallel thereto. As shown in FIG. 1, the slider 30 has at least one long slot 36. For illustrative purposes, two slots 36 are shown in opposite sides of a sliding direction of the slider 30. This arrangement is preferable to prevent slider 30 from rolling that may occur, for example, when slider 30 moves.

The slider may further include, for example, a middle portion 32 and side portions 33. It is preferable that the middle portion 32 faces a front surface of the body. The side portions 33 may be on opposite sides of and higher than the middle portion 32. However, the relative positions of these features may be varied if desired.

It is also preferable that side portions 33 are elastically supported on the elastic members 20, and that the middle portion 32 is not in direct contact with the front surface of the body 10. Therefore, if the slider is pressed in a direction of the body, the slider moves toward the body 10 elastically. If a force pressing down the slider is removed, the slider moves up again by an elastic force of the elastic member. Accordingly, when the user moves the slider, the user can feel that the slider moves smoothly and elastically.

Each of the side portions 33 of the slider 30 has at least one long groove 34, and slot 36 is provided in a bottom of each groove 34. The groove and slot are preferably provided in a direction of movement of the slider 30. Groove 34 optionally has a length and a width greater than those of the slot 36 respectively. An upper portion of the guide member 40 is inserted in the groove 34.

The guide member is passed through the slot 36, and is connected to the body 10. The guide member may include, for example, a guide 42 for guiding the slider to slide with respect to the body 10, and a head 44 for preventing the slider 30 from breaking away from the body 10.

The guide 42 is passed through the slot 36 and is connected to the body 10. Accordingly, the slider can slide stably in a length direction of slot 36 under the guidance of guide 42.

The guide 42 may be elongated in a length direction of slot 36 for preventing the slider 30 from yawing, and for stably guiding the slider 30. The lower portion of the guide 42 may be inserted in the recess 14 in the body 10.

The head 44 extends from a top of the guide 42. For preventing the slider 30 from breaking away from the body 10, the head has a width larger than slot 36, which is equal to, or slightly smaller than a width of the groove 34 to allow head 44 to be inserted in the groove 34, thereby reducing a thickness of the slide assembly. Moreover, it is preferable that a top surface of the head 44 is provided at a height lower than a top surface of the groove 34. Then, even if any component is attached to a front surface of the slider 30, i.e., to a surface opposite to a surface of the slider 30 facing the body 10, interference between the component and the head 44 can be prevented when the slider 30 moves.

The groove in the slider 30 may have, for example, a cover 60 inserted therein. As shown in FIGS. 1 and 2, the cover 60 has an elongated shape, and is inserted and held in groove 34 such that the cover covers the groove 34 and the slot 36, to permit easy attachment of various components to the front surface of the slider 30.

The elastic member 20 is in contact with, and supports, the body 10 and the slider 30 elastically. The elastic member, for example, attached to a back surface of the body 10 and has one portion passed through the aperture 12 in the body 10, and come into contact with the side portion 33 of the slider 30 elastically to permit a reduction in thickness of the slide assembly to be realized. This arrangement also allows only the elastic member 20 to be replaced without separating slider 30 and the guide member 40, thereby permitting easy repair of the mobile phone. This structure is not limited to the above, but the elastic member 20 may be attached to the front surface of the body 10 when the recess 12 in the body 10 is not required.

Figure 3:
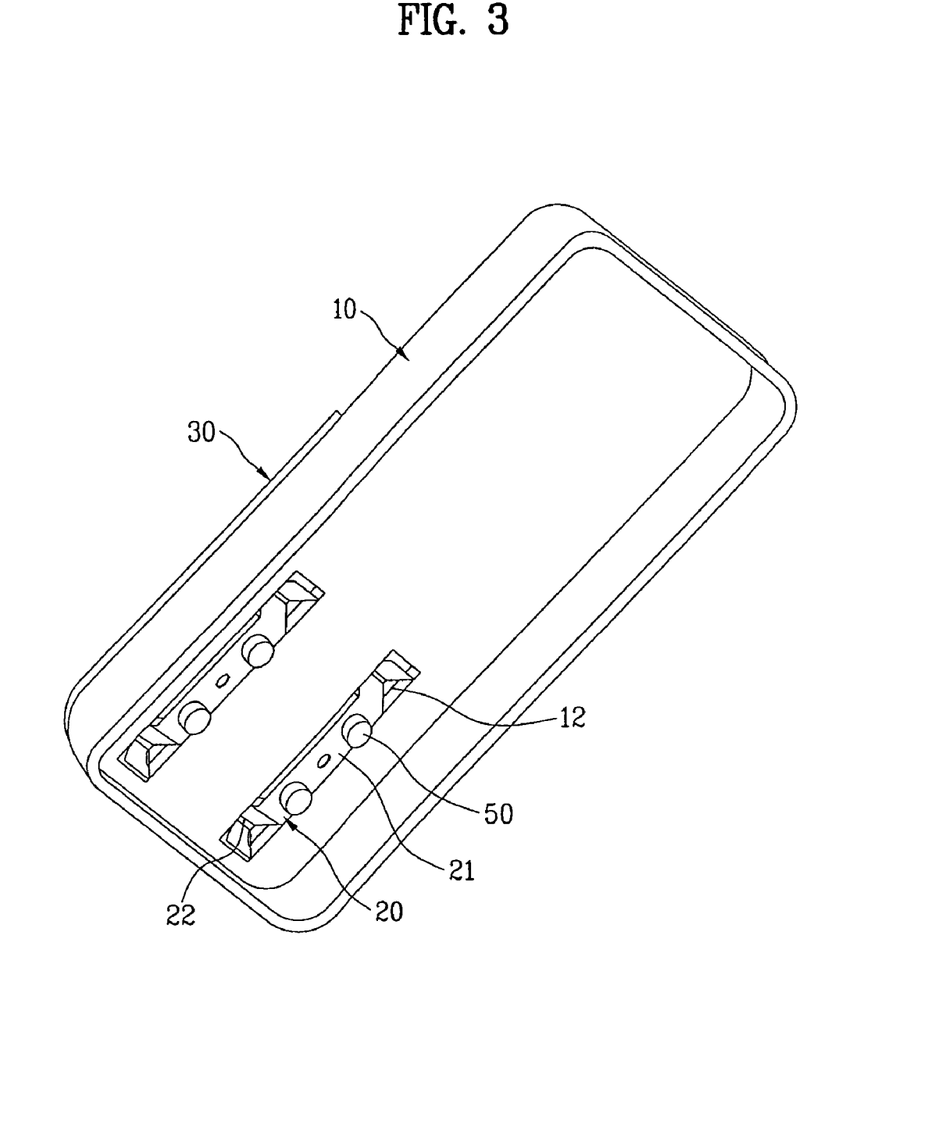
FIG. 3 illustrates a back perspective view of the assembled slide assembly in FIG. 1.

Referring to FIGS. 1 and 3, elastic member 20 preferably includes a flat portion 21 to be attached to the back surface of the body 10, and at least one bent portion 22 projected from the flat portion 21 toward the body 10. The bent portions 22 extend from opposite ends of the flat portion for passing through the aperture 12. The bent portions also come into contact with the slider 30, to support the slider 30 elastically.

Referring to FIG. 2, elastic member 20, and more specifically bent portion 22, supports portions of the slider 30 adjacent to opposite sides of the slot 36. The bent portion 22 may have a width greater than a width of the slot 36.

Figure 4:
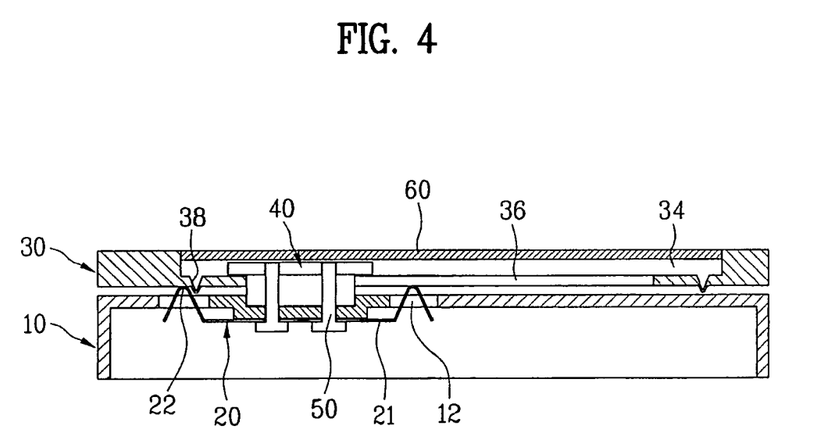
FIG. 4 illustrates a section of the assembled slide assembly in FIG. 1 when the slider is at an initial position.
Figure 5:
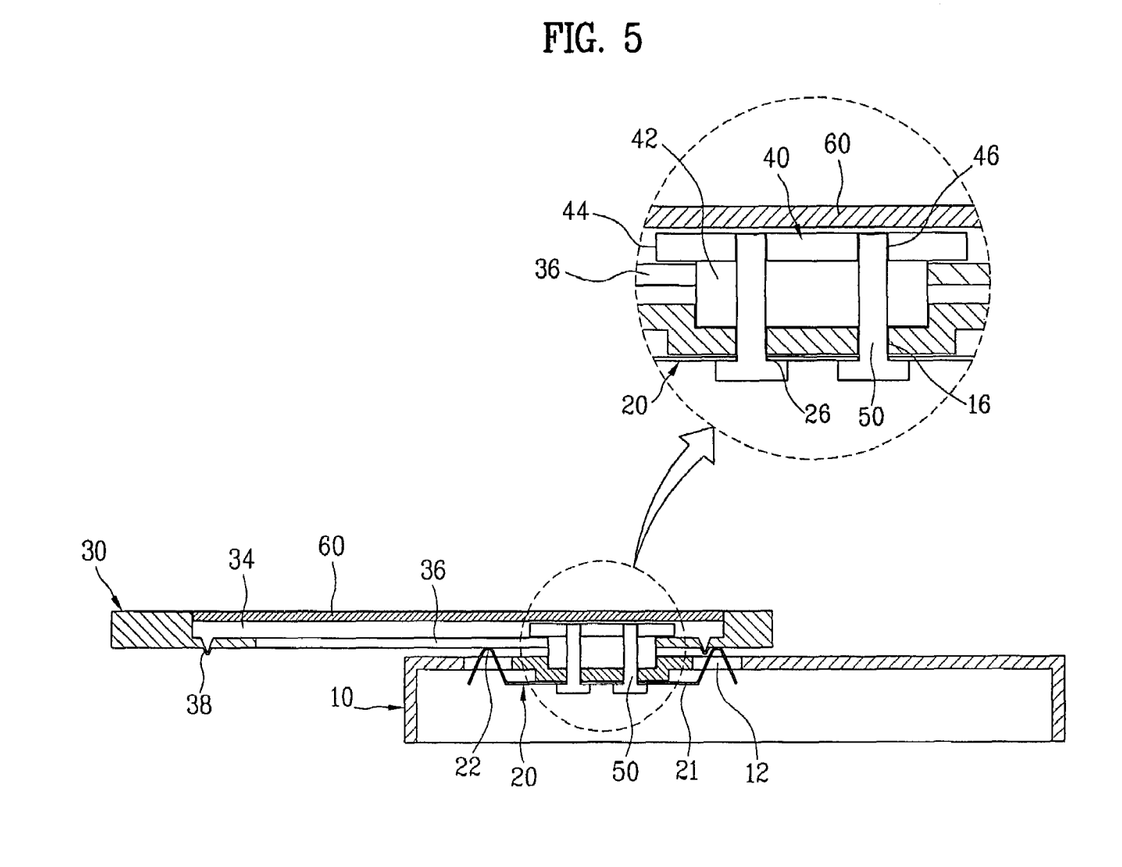
FIG. 5 illustrates a section of the slide assembly in FIG. 4 when the slider is at a final position.

Referring to FIGS. 2, 4, and 5, elastic member 20 supports the slider 30 from front and back sides of the guide member 40 with respect to a direction of movement of the slider 30, to prevent the elongated slider 30 from pitching.

Elastic members 20, guide members 40, and body 10 are held together. Elastic member 20 and guide member 40 may be bonded to the body with an adhesive or other fastening member respectively. However, as shown in FIG. 1, for making the structure of the slide assembly simple and assembly easy, the present invention preferably holds the elastic member, guide member, and body together with one fastening member 50.

To achieve this assembly, the flat portion 21 of the elastic member 20, the recess 14 in the body 10, and the guide member 40 are respectively provided with pass through holes 26, 16, and 46 in communication with each other. Fastening member 50, such as a screw, is passed through elastic member 20, and body 10 and fastened to guide member 40.

Because the slider is elastically supported on elastic member 20, if no external force is applied to the slider after the slider moves, there is no change of a position of the slider. Nevertheless, the slider is liable to move due to unexpected external forces during manipulation of the mobile phone.

In order to prevent this from happening, a structure is required for fixing initial and final positions of slider 30. The initial position may, for example, be a position where the slider does not slide from the body, and a final position may be a position where the slider slides from the body to a maximum extent.

For this, the slide assembly of the present invention is provided with at least one projection 38 for holding the elastic member 20 to fix the initial or the final position of the slider 30. The projection 38 is projected toward the body 10 from the slider 30, more specifically between an end of the groove 34 and an end of the slot 36.

Referring to FIGS. 4 and 5, this structure enables projection 38 to hold the bent portion 22 of the elastic member 20, when the slider 30 stops at either one of the opposite ends of the slot 36, i.e., when the slider 30 is at the initial or final position. Therefore, the slider may be securely held at the initial position or final position.

If the slider 30 is pushed for shifting the slider from the initial or final position or a position therebetween, bent portion 22 of the elastic member 20 is restored after being deformed elastically when the bent portion 22 passes the projection 38, when the elastic member 20 makes a clicking sound.

Accordingly, projection 38 enables not only secure fixing of the initial and final positions of the slider, but also allows the user to be aware of an operation state of the slider 30 when the user manipulates the slider. This allows the user to obtain a feeling of manipulation, which may prove desirable during operation.

Operation of the foregoing embodiment of the slide assembly of the present invention will now be described. For reference, FIG. 4 illustrates a section of the assembled slide assembly in FIG. 1 when the slider is at an initial position, and FIG. 5 illustrates a section of the slide assembly in FIG. 4 when the slider is at a final position.

Referring to FIG. 4, when the slider 30 is at the initial position, one end of the slot 36 is engaged with the guide 42 of the guide member 40, and one of the projections 38 is engaged with one of bent portion of the elastic member 20. In this instance, the projection 38 is located between the bent portion 22, and the guide member 40.

According to this, the guide member 40 prevents the slider 30 from moving in a right side direction of FIG. 4 and the projection 38, and the elastic member 20 prevents the slider 30 from moving in a left side direction of FIG. 4. Therefore, when a strong external force is applied to the slider, the slider securely maintains the initial position.

If a strong force is applied to the slider in a left side direction of FIG. 4, the projection 38 moves in the left side direction of FIG. 4 together with the slider 30 while pressing the bent portion 22 of the elastic member 20. Once the projection 38 is moved, the bent portion 22 returns to an original position again by an elastic force after moving toward a lower side of FIG. 4, when a clicking sound occurs. At this time, vibration transmits to a hand of the user, such that the user knows that the slide assembly of the mobile phone is operative normally.

When the slider 30 moves in a left side direction of FIG. 4, slot 36 and guide member 40 guides sliding of the slider. If the slider keeps moving, the other one of the projections 38 passes the other one of the bent portions 22 of the elastic member 20, and reaches to the final position. In this instance, since "click" sounds from the bent portion 22 and resulting vibrations transmit to the user's hand, it is easy for the user to know that the slider has moved completely.

Referring to FIG. 5, at the final position guide 42 of the guide member is in contact with the other end of slot 36. The other one of the projections 38 is in contact with the other one of the bent portions 22 of the elastic member 20.

The guide member 40 prevents the slider 30 from further moving to a left side direction of FIG. 5. The projection 38 and elastic member 20 prevent the slider 30 from moving to a right side direction of FIG. 5. Therefore, unless a strong force is applied to the slider 30 in the right side direction of FIG. 5, the slider 30 securely maintains the final position.

At the time slider 30 is at the final position, the user may use the mobile phone, e.g., send/receive calls or other forms of communication, input characters, or the like. Of course, if a keypad and display are provided to the slider, the user can use the mobile phone even when the slider is at the initial position.

Thus, the slide assembly of the present invention has a structure in which the guide member connects the slider and the body and guides slide of the slider. Therefore, the structure of the slide assembly not only is made much simpler, but also a thickness of the mobile communication device having the slide assembly applied thereto, such as the mobile phone, the PDA, or the like, can be significantly reduced.

Moreover, the slider is supported on an elastic member elastically, and the projection securely maintains the initial position and the final position of the slider. Therefore, the slider not only moves smoothly but is also securely operative.

Furthermore, since "click" sounds and vibrations thereof transmit to a hand of the user when the slider moves away or returns to the initial or final position, the user is able to know operation and moving states of the slider easily.

Moreover, since the elastic member is attached to a back surface of the body, only the elastic member can be replaced without removing the slider and the guide member when the slide assembly, particularly, the elastic member is out of order.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art.

What is claimed is:

1. A slide assembly for a mobile communication device, comprising:
   a body;
   a slider arranged parallel to the body and having at least one slot;
   at least one guide member, passed through the slot and connected to the body, to guide the slider to slide relative to the body and to prevent the slider from separating from the body, wherein the body has a flat surface and wherein the guide member allows the slider to slide along a path that is substantially parallel to the flat surface of the body;

an elastic member in contact with the body and slider to support the body and the slider elastically; and a fastening member to hold the elastic member, the guide member, and the body together, wherein the fastening member is passed through the body and the elastic member and fastened to the guide member.

2. The slide assembly of claim 1, wherein slots are located on opposite sides of a sliding direction of the slider.

3. The slide assembly of claim 1, wherein the elastic member includes:
   a flat portion attached to the body, and
   one or more bent portions projected toward the slider from the flat portion to support the slider elastically.

4. The slide assembly of claim 3, wherein the bent portions are located at opposite ends of the flat portion.

5. The slide assembly of claim 3, wherein each of the bent portions has a width larger than a width of the slot, and supports a portion of the slider adjacent to opposite sides of the slot.

6. The slide assembly of claim 3, wherein the flat portion is fastened to a back surface of the body, and the bent portion passes through the body.

7. The slide assembly of claim 1, wherein the elastic member supports the slider from front and back sides of the guide member with respect to a moving direction of the slider.

8. The slide assembly of claim 1, wherein the slider further includes at least one projection towards the body from the slider to hold the elastic member when the guide member is moved to and stops at an end of the slot.

9. The slide assembly of claim 1, wherein the slider further includes:
   at least one groove for receiving an upper portion of the guide member, the groove having a bottom provided with the slot.

10. The slide assembly of claim 1, wherein the body includes at least one recess for inserting a lower portion of the guide member.

11. The slide assembly of claim 1, wherein the guide member includes:
    a guide passed through the slot and connected to the body, and
    a head on top of the guide and having a width larger than a width of the slot.

12. The slide assembly of claim 1, further comprising:
    an opening in at least one of the body and the slider to pass of wires electrically connecting electrical components mounted on the body and the slider.

13. A slide assembly for a mobile communication device, comprising:
    a body;
    a slider arranged parallel to the body and having at least one slot; and
    at least one guide member, passed through the slot and connected to the body, to guide the slider to slide relative to the body and to prevent the slider from separating from the body, wherein the slider includes at least one groove for receiving an upper portion of the guide member, the groove having a bottom provided with the slot, and wherein the slider further includes at least one cover inserted in the groove.

14. A slide assembly for a mobile communication device, comprising:
    a body;
    a slider arranged parallel to the body and having at least one slot;
    at least one guide member, passed through the slot and connected to the body, to guide the slider to slide relative to the body and to prevent the slider from separating from the body; and
    an elastic member in contact with the body and slider to support the body and the slider elastically, wherein the slider further includes:
    a middle portion facing a front surface of the body, and
    side portions on opposite sides of and higher than the middle portion, the side portions being supported on the elastic members.

15. A slide assembly for a mobile communication device, comprising:
    a body having at least one aperture;
    a slider on a front surface of the body and having at least one groove and a slot in a bottom of the groove;
    at least one guide member having a guide passed through the slot and connected to the body, and a head extended to a width larger than a width of the slot from an upper portion of the guide; and
    an elastic member, attached to a back of the body, having a portion passed through the aperture and elastically supporting the slider.

16. The slide assembly as claimed in claim 15, further comprising:
    pass through holes respectively provided to allow the elastic member, body, and guide member to communicate with each other; and
    a fastening member passing through the pass-through holes to fasten the elastic member, guide member, and body.

17. The slide assembly of claim 15, wherein the elastic member includes:
    a flat portion attached to a back surface of the body, and at least one bent portion projecting toward the slider from opposite ends of the flat portion so as to be in contact with the slider through the aperture.

18. The slide assembly of claim 17, wherein the bent portion has a width larger than a width of the slot, and supports a portion of the slider adjacent to opposite sides of the slot.

19. The slide assembly of claim 15, wherein the body includes:
    a recess for inserting a lower portion of the guide member.

20. The slide assembly of claim 15, wherein the head is inserted in the groove.

21. The slide assembly of claim 15, wherein the slider further includes:
    a middle portion facing a front surface of the body, and
    side portions on opposite sides of and higher than the middle portion, the side portions being supported on the elastic members.

22. The slide assembly of claim 21, wherein the groove and slot are provided adjacent at least one of the side portions.

23. The slide assembly of claim 15, wherein the slider further includes:
    at least one projection projected toward the body from a portion between an end of the groove and an end of the slot for holding the guide member when the guide member is moved to and stopped at the end of the slot.

24. The slide assembly of claim 15, wherein the slider further includes:
    a cover inserted in the groove for covering the guide member and the slot.

25. The slide assembly of claim 15, further comprising:
an opening in at least one of the body and the slider, to allow passage of wires to electrically connect electrical components mounted on the body and slider.

26. A slide assembly for a mobile communication device, comprising:
a body;
a slider arranged parallel to the body and having at least one slot;
at least one guide member, passed through the slot and connected to the body, to guide the slider to slide relative to the body and to prevent the slider from separating from the body, wherein the body has a flat surface and wherein the guide member allows the slider to slide along a path that is substantially parallel to the flat surface of the body; and
an elastic member in contact with the body and slider to support the body and the slider elastically, wherein the elastic member is coupled to the guide member and includes:
a first bent portion located on a first side of the guide member, and
a second bent portion located on a second side of the guide member,
wherein the first bent portion deflects to generate a clicking noise when the slider slides to a first position along said path and wherein the second bent portion deflects to generate a clicking noise when the slider slides to a second position along said path.

27. The slide assembly of claim 26, wherein the first position corresponds to an extended position of the slider relative to the body and the second position corresponds to a closed position of the slider relative to the body.

28. The slide assembly of claim 27, further comprising:
a first projection at a first end of the slider, and
a second projection at a second end of the slider,
wherein the first projection causes the first bent portion to deflect to generate said clicking noise when the slider slides to the first position along the path, and wherein the second projection causes the second bent portion to deflect to generate said clicking noise when the slider slides to the second position along said path.

29. The slide assembly of claim 28, wherein the first projection is located between the first bent portion and the first side of the guide member in said extended position, and wherein the second projection is located between the second bent portion and the second side of the guide member in said closed position.

30. The slide assembly of claim 28, wherein the first and second projections are located at opposite ends of a groove, the slot located in the groove.

31. The slide assembly of claim 26, wherein the first bent portion projects through a first aperture in the body and the second bent portion extends through a second aperture of the body.

32. The slide assembly of claim 26, further comprising: a fastening member to couple the elastic member to the guide member through the body.

* * * * *